Aug. 8, 1961 S. R. RICH 2,995,347
VIBRATOR AND DIAPHRAGM ASSEMBLY
Filed Oct. 21, 1958
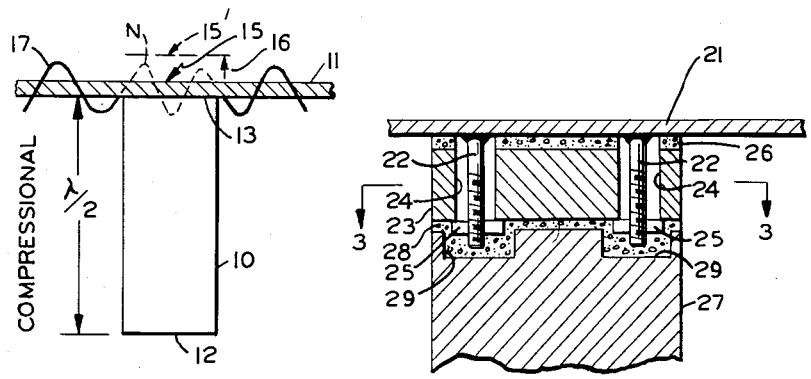
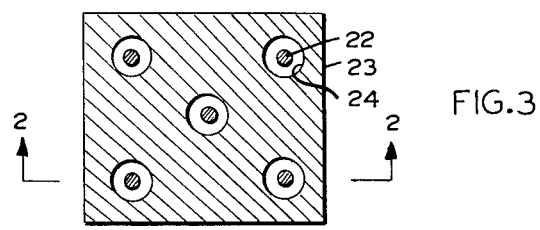
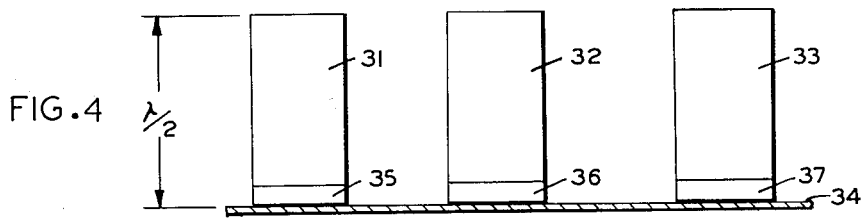
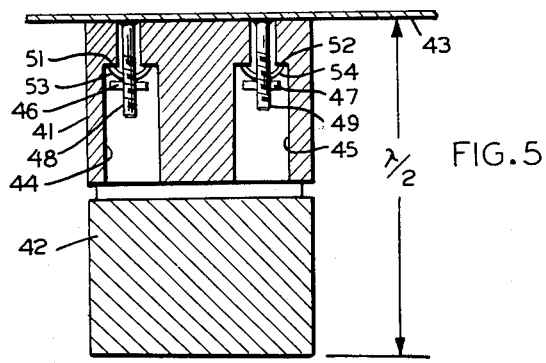
INVENTOR
STANLEY R. RICH
ATTORNEY

United States Patent Office 2,995,347
Patented Aug. 8, 1961

2,995,347
VIBRATOR AND DIAPHRAGM ASSEMBLY
Stanley R. Rich, West Hartford, Conn., assignor to The General Ultrasonics Company, a corporation of Connecticut
Filed Oct. 21, 1958, Ser. No. 768,697
6 Claims. (Cl. 259—72)

This invention relates to mechanical vibrator and diaphragm assemblies, and more particularly to the suppression of transverse vibrations in diaphragms in such assemblies.

Many useful forms of mechanical vibrators involve the use of a transducer of elastic waves in combination with a diaphragm. For example, in the treatment of liquids with compressional wave energy supplied by an electro-mechanical transducer as a source of compressional wave energy, it is usual to separate the transducer from the liquid by means of a diaphragm. The diaphragm may be a portion of a wall of the liquid container itself, or it may be a portion of the wall of an envelope around the transducer, the whole being immersible in a liquid bath. In either case, the transducer will be coupled to the diaphragm in a manner to set up compressional wave energy in the liquid. Generally this combination involves causing a portion of the diaphragm to move, at the vibration frequency, to-and-from the liquid as seen at the boundary of the liquid and the vibrating portion of the diaphragm. If the diaphragm is so compliant that it is relatively incapable of sustaining flexural vibrations such combinations can function quite efficiently. On the other hand, if it is desired to use a diaphragm of any substantial stiffness, flexural vibrations can be expected to occur in the diaphragm, traveling away from the region to which the transducer is coupled. These flexural vibrations represent energy losses in an unwanted vibrational mode, and can cause serious losses, which may injure the equipment, especially when high-power vibrational energy is employed.

My copending application Serial No. 701,891, filed December 10, 1957, now U.S. Patent No. 2,956,538, is addressed to the control of flexural vibrations in diaphragms adjacent the region to which the mechanical vibrators are coupled. I have found that as the elastic wave energy level is increased to higher and higher power levels such flexural vibrations manifest themselves in the latter region as well, and eventually can contain sufficient energy to rupture bonds of even the strongest known adhesives or cements. My present invention has as an object to prevent the separation of a diaphragm from mechanical vibrators coupled to it in order to enable the efficient handling of increasingly high power levels of elastic wave energy. Another object of the invention is to provide improved arrangements for affixing such vibrators to a diaphragm in a fashion which will at the same time assure highly efficient transfer of energy through the diaphragm and be suitable for fabrication in quantity production and for use under a wide variety of conditions.

One of the most convenient types of vibrator used for interchanging compressional wave energy with liquids is the longitudinal vibrator. A face of the vibrator which moves to-and-from the liquid is used, and this face is held against or affixed to the diaphragm. As a coupling, it is usual to employ a cement between this face and the diaphragm. The cement is preferably a good transmitter of elastic waves. Epoxy cements are suitable for this purpose. However, while such cements have great shear resistance, their peel strength is not able to prevent separation from the diaphragm or the vibrator, as may occur when high levels of elastic wave energy are being interchanged or under certain conditions of mechanical shock.

My copending application Serial No. 653,945, filed April 19, 1957, now U.S. Patent No. 2,956,789, discloses a mounting arrangement in which rigid elements pass from the diaphragm into the vibrator through the vibrator face adjacent the diaphragm, and make use of the shear resistance of cement in two orthogonally related directions to hold a vibrator to a diaphragm against mechanical shock and high-power-level operation. While such arrangements work well, as the power level of elastic wave energy is increased higher and higher, eventually transverse waves in the diaphragm can peel the diaphragm from the vibrator face in selected portions of the coupling region, thereby reducing the efficiency of the coupling. It is a further object of the present invention to prevent such peeling.

According to my present invention, the cement used to acoustically couple a longitudinal mechanical vibrator to a diaphragm is placed under compressional stress by bolting or otherwise clamping a portion of the vibrator, for example, a stiff slab, to the diaphragm with the cement between them. The remainder of the vibrator is affixed to this portion, employing if desired the technique disclosed in my aforementioned copending application Serial No. 653,945. Preferably the slab and the remainder of the vibrator together are dimensioned to constitute a longitudinally-resonant longitudinal vibrator, for example a half-wave vibrator.

Further advantages and features of this invention will appear from the description of certain embodiments thereof which follows. The description refers to the attached drawing, wherein:

FIG. 1 is partial elevation and section showing a structure not including my present invention, to illustrate the problem more clearly;

FIG. 2 is a partial section, taken along line 2—2 of FIG. 3, of a structure embodying my present invention;

FIG. 3 is a section along line 3—3 of FIG. 2;

FIG. 4 is a partial elevation and section of a combined multiple-vibrator and single-diaphragm structure embodying my invention; and FIG. 5 is a partial elevation of another embodiment of the invention.

Referring to FIG. 1, a transducer 10 of the kind designed to vibrate as a one-half wave longitudinal vibrator, is coupled to a diaphragm 11. The transducer may be of any kind, for example as illustrated in my copending application Serial No. 606,478, filed August 27, 1956, now U.S. Patent No. 2,947,889. During vibration in a longitudinal mode, the ends 12 and 13 of the transducer will alternately move toward and away from each other at the vibration frequency, and the portion 15 of the diaphragm which is coupled to one end 13 will move with it. During one half-cycle of this motion the portion 15 of the diaphragm will move in the direction of the arrow 16, and that portion will advance to a new position 15′, illustrated by a dotted line. If the diaphragm 11 were fully compliant, the remainder of the diaphragm would "remain behind" during this advance of the portion 15 coupled to the transducer 10. However, this is possible only with highly flexible materials, like rubber or very thin sheets of metals. Where for other reasons it is necessary to employ relatively stiff diaphragms, this is not possible and adjacent parts of the diaphragm will follow the displaced portion 15. If we now consider that the portion 15 of the diaphragm which is coupled to the transducer 10 is being alternately "advanced" and "retarded" (not shown) by the transducer during vibration, we see that the region of the diaphragm immediately adjacent the transducer 10 is being moved transversely to the diaphragm at the transducer frequency. This action sets up transverse vibrations in the diaphragm in the same manner as similar motion will set up transverse vibrations in a taut wire or a stiff rod. The frequency of the transverse vibrations will be the same as that of the transducer, and the wave length will be a function of the unit mass and stiffness of the diaphragm 11. Dotted line curves 17 are an instantaneous illustration of such transverse waves, here shown exaggerated in amplitude for the purpose of illustrating the description to follow.

When energy at a low power level is being transduced by the system, the transverse waves in the diaphragm will be absent, or at most of small amplitude, in the region 15 coupled to the vibrator. As the power level is increased, however, the amplitude of the transverse wave in the diaphragm will tend to increase, and one or more antinodes N of this wave will begin to exert greater and greater force tending to part the cement (not shown) which is usually present between the diaphragm and the confronting end surface 13 of the vibrator. This force will tend to peel the cement from the vibrator or the diaphragm, or both. Upon even the slightest rupture of the cement, the diaphragm will become more free to execute transverse vibrations in the coupling region 15, so that the rupture process is cumulative. As is well known, cements have relatively low peel strength, and rupture of the acoustical cement bond severely reduces the efficiency of wave energy transfer through the diaphragm to or from the vibrator.

Referring now to FIG. 2, which is enlarged approximately three times with respect to FIG. 1, a diaphragm 21, which in practice may be a sheet of stainless steel about 0.050 inch thick, has a plurality of elongated mounting elements in the form of threaded bolts 22 welded or otherwise firmly affixed to it at one side. A slab 23 of solid material, provided with a passage 24 for each bolt is preferably cemented at one side to the diaphragm 21, by means of an acoustical cement 26, in a position such that each bolt 22 passes through one of the holes 24. The slab 23 is tightened against the diaphragm 21 by means of bolts 25, under which spring washers (not shown) may be used if desired. The bolts are tightened to place the cement 26 under a compressive stress sufficiently great to resist rupture of the cement due to transverse waves (17 in FIG. 1) in the diaphragm 21 at all power levels contemplated to be handled. The vibrator 27 (of which only one end is shown) is cemented to the other or opposite side of the slab 23 with an acoustical cement 28 which may be the same as cement 26. Following the teaching of my above-mentioned copending application Serial No. 653,945, this latter cement 28 fills not only the space between the confronting faces of the transducer 27 and the slab 23, but also the wells 29 bored into the transducer 27 into which the free ends of the bolts 22 and the nuts 25 project, so that the cement 28 is under shear stress in the wells at the same time that it is under peel strain between the transducer 27 and the slab 23.

Referring to FIG. 3, it is seen that five bolts 22 may be employed if desired, to spread the clamping force on the cement 26 between the slab 23 and the diaphragm 21 with a high degree of uniformity. This arrangement increases the assurance that the diaphragm 21 and the slab 23 will behave as a single unit in the presence of elastic wave energy, by reducing the opportunity for transverse waves to exist in the region of the diaphragm which is affixed to the slab. There results, in effect, a diaphragm which is discontinuous in thickness at the boundary of the slab 23, so that transverse waves which will propagate in the thinner portions of the diaphragm surrounding this boundary will not tend to propagate across the boundary. The reason for this is that the wavelength of transverse waves in the so-thickened section is so large with respect to the transducer end face area that this area behaves substantially like a piston, with substantially no transverse wave motion. Under these conditions, the bond afforded by the cement 28 between the transducer 27 and the slab 23 will not be subjected to the parting forces of such transverse waves, and the power-handling capability of this system will be greater than that of prior systems.

Clearly, the number of bolts 22 to be used in a given case will depend upon many variables, among them the elastic properties of the diaphragm, the area of its contact with the vibrator, the power to be handled, and the frequency of the vibrator. The showing of FIG. 3 is intended by way of example only, and not by way of limitation.

The manner of attaching the bolts 22 to the diaphragm 21 is likewise subject to choice in a given case. If liquid leaks will not be a problem, the bolts can pass completely through the diaphragm. However, an unperforated diaphragm is preferable in most practical situations, and the embodiment of FIG. 2 is an entirely novel structure for firmly mechanically mounting a vibrator to a diaphragm without perforating the diaphragm. As is mentioned above, the bolts 22 can be welded directly to the surface of the diaphragm 21.

The slab 23 can be made of any suitable material which has acoustical properties similar to those of the vibrator 27. Preferably it is of the same material and has the same cross-sectional dimensions as the vibrator 27, and its thickness is such that when affixed to the end of the vibrator it constitutes with the vibrator a longitudinal resonator of correct length (e.g. one half wave length) for the desired frequency of operation. The slab 23 must be sufficiently thick to satisfy the condition, stated above, that when it is clamped to the diaphragm, the combination behaves like a piston during operation.

Referring to FIG. 4, three half-wave longitudinal vibrators 31, 32 and 33 are shown mounted on a diaphragm 34 in the manner illustrated in FIG. 2. Each vibrator includes a slab 35, 36, 37 (respectively), equivalent to the slab 23 of FIG. 2. This figure shows how the slab is made part of the longitudinally-resonant vibrator, to provide in effect a longitudinally-resonant vibrator which is internally bolted or otherwise firmly mechanically fastened to a diaphragm.

FIG. 5 illustrates an adaptation of my present invention to vibrators according to my above-mentioned copending application Serial No. 606,478. Such vibrators are of a variety having two halves 41 and 42 comprising a longitudinally-resonant (e.g. half-wave) vibrator. The half 41 which is affixed to the diaphragm 43 may be bored out, as at 44 and 45 to provide room to affix nuts 46 and 47 to bolts 48 and 49, which in turn are affixed to the diaphragm 43. The bores 44 and 45 are reduced in diameter near the end of the vibrator to provide shoulders 51 and 52, on which spring washers 53 and 54 (if desired) may rest under the nuts 46 and 47 respectively. Obviously similar spring washers may be used in FIG. 2, if desired. No cement is shown in FIG. 5, for the sake of clarity of illustration, it being obvious that the cement 26 of FIG. 2 can be used in FIG. 5 as well. As in FIG. 2, the nuts 46 and 47 can be tightened to clamp the vibrator to the diaphragm with the desired force to prevent transverse waves in the diaphragm 43 from existing in the region coupled to the vibrator, and enabling the handling of increased power levels of elastic wave energy.

Other embodiments of my invention will occur to those skilled in the art. The claims which follow are not intended to be limited to the embodiments herein illustrated and described, other than by their own express terms.

What I claim is:

1. In combination, a longitudinal vibrator having an end surface through which to pass elastic waves and side walls meeting said surface at its periphery, a flexible diaphragm having an area larger than the area of said end surface, a flat slab of stiff material having first and second opposite sides, each of said sides having an area substantially identical to that of said end surface, said slab being disposed with said first side confronting said diaphragm, an aperture through said slab and said sides, an elongated mounting element affixed at one end to said diaphragm and extending at the other end away from said diaphragm, said slab being clamped at said first side to said diaphragm by said mounting element, said mounting element passing through said aperture and extending at said other end beyond the second side of said slab, said vibrator having a bore opening through said end surface located to be in register with said aperture when said end surface and said second side of said slab are confronting with the periphery of said slab in register with the periphery of said end surface, said other end of said mounting element passing into said vibrator through said bore, and cement which is able to resist shear stress between said end surface and said second side of said slab and between said mounting element and the interior portions of said bore.

2. Combination according ot claim 1 including cement between said diaphragm and said first side of said slab, said cement being compressed by said mounting element, whereby during vibration of said vibrator said slab and the portion of said diaphragm contiguous thereto behave as a piston relative to transverse vibrations in the portion of said diaphragm surrounding said portion.

3. Combination according to claim 1 in which the thickness of said slab and the length of said vibrator together are equivalent to the length of a longitudinally resonant vibrator at the intended frequency of vibration.

4. Combination according to claim 1 in which said diaphragm is composed of metal and said mounting element is a bolt welded at one end to said diaphragm.

5. In combination, a longitudinal vibrator having an end surface through which to pass elastic waves and side walls meeting said surface at its periphery, a flexible diaphragm having an area larger than the area of said end surface, a flat slab of stiff material having first and second opposite sides, each of said sides having an area substantially identical to that of said end surface, said slab being disposed with said first side confronting said diaphragm, a plurality of apertures through said slab and said sides, an equal plurality of elongated mounting elements each affixed at one end to said diaphragm and extending normally therefrom with its other end free, each of said elements passing through one of said apertures, said mounting elements clamping said slab at said first side to said diaphragm and each mounting element extending at its free end beyond the second side of said slab, said vibrator having a like number of bores through said end surface located to be in register one with each of said apertures when said end surface and said second side of said slab are confronting with the periphery of said slab in register with the periphery of said surface, said free end of each mounting element passing into said vibrator through an individual one of said bores, and cement which is able to resist shear stress between said end surface and said second side of said slab and between each of said mounting elements and the interior portion of the bore in which the free end thereof is disposed.

6. Combination according to claim 5 including cement between said diaphragm and said first side of said slab, said cement being compressed by said mounting elements, whereby during vibration of said vibrator said slab and the portion of said diaphragm contiguous thereto behave as a piston relative to transverse vibrations in the portion of said diaphragm surrounding said portion.

References Cited in the file of this patent

UNITED STATES PATENTS

| | | |
|---|---|---|
| 2,396,005 | Gross et al. | Mar. 5, 1946 |
| 2,498,990 | Fryklund | Feb. 28, 1950 |
| 2,738,173 | Massa | Mar. 13, 1956 |
| 2,746,813 | Massa | May 22, 1956 |
| 2,834,158 | Petermann | May 13, 1958 |
| 2,854,012 | Murdock | Sept. 30, 1958 |